US007551464B2

(12) United States Patent
Chen

(10) Patent No.: US 7,551,464 B2

(45) Date of Patent: Jun. 23, 2009

(54) CURRENT OVERLOADING PROOF SWITCH POWER SUPPLY AND ITS IC

(75) Inventor: Weibin Chen, 6-505, Hai Yue Garden, No.38, Mu Xu Yuan Da Jie, Nanjing, Jiangsu Province (CN)

(73) Assignees: Weibin Chen, Nanjing, Jiangsu (CN); Tao Jing, Nanjing, Jiangsu (CN)

(*) Notice: Subject to any disclaimer, the term of this patent is extended or adjusted under 35 U.S.C. 154(b) by 0 days.

(21) Appl. No.: 11/489,133

(22) Filed: Jul. 18, 2006

(65) Prior Publication Data

US 2006/0256588 A1 Nov. 16, 2006

Related U.S. Application Data

(62) Division of application No. 10/510,198, filed on Sep. 29, 2004, now abandoned.

(51) Int. Cl.
*H02M 7/5395* (2006.01)

(52) U.S. Cl. ....................................... 363/97; 363/56.1

(58) Field of Classification Search ................. 323/282, 323/21.1, 21.18, 97; 363/21.1, 21.18, 56.1, 363/97

See application file for complete search history.

(56) References Cited

U.S. PATENT DOCUMENTS

| | | | | |
|---|---|---|---|---|
| 4,888,821 | A * | 12/1989 | Hamp et al. | 363/21.02 |
| 4,952,819 | A * | 8/1990 | Herrmann | 327/379 |
| 5,285,366 | A * | 2/1994 | Zaretsky | 363/56.1 |
| 5,995,386 | A * | 11/1999 | John et al. | 363/21.18 |
| 6,049,471 | A * | 4/2000 | Korcharz et al. | 363/20 |
| 6,385,060 | B1 * | 5/2002 | Basso et al. | 363/21.15 |
| 6,646,897 | B1 * | 11/2003 | Lomax et al. | 363/97 |
| 6,674,656 | B1 * | 1/2004 | Yang et al. | 363/21.1 |
| 6,853,563 | B1 * | 2/2005 | Yang et al. | 363/21.15 |

* cited by examiner

*Primary Examiner*—Jeffrey L Sterrett
(74) *Attorney, Agent, or Firm*—Raymond Y. Chan; David and Raymond Patent Firm

(57) ABSTRACT

The present invention provides a method for preventing current overloading and saturation of a switch power supply, including one of the steps of checking whether a primary current of an transformer, and a current of an induction or a current of field effect transistor being excess an upper limit current; and a step for generating an adjusting signal so as to directly or indirectly adjust an error signal if the upper limit current is excess the upper limit, so that during subsequent pulse adjustable periods, a duty cycle is reduced, the primary current or the induction current or field effect transistor peak current value are reduced.

6 Claims, 3 Drawing Sheets

CURRENT OVERLOADING PROOF SWITCH POWER SUPPLY AND ITS IC

CROSS REFERENCE OF RELATED APPLICATION

This is a Divisional application of a non-provisional application having an application Ser. No. 10/510,198 and filing date of Sep. 29, 2004 now abandoned.

BACKGROUND OF THE PRESENT INVENTION

1. Field of Invention

The present invention relates to switch power supply, more particularly, relates to a switch power supply having current overloading proof function and it's IC.

2. Description of Related Arts

Switching power converters are used in a wide variety of applications to convert electrical power from one form to another form. For example, DC/DC converters are used to convert DC power provided at one voltage level to DC power at another voltage level and AC-DC converters are employed to convert alternate current power into direct current power. At the same time, switching power converter could be categorized into isolated or non-isolated power converter, and the basic circuit of the converter can be configured to step up (boost), step down (buck), or invert type, even CCM (continuous conduction mode) or DCM (discontinuous conduction mode).

The isolated power converter could be further classified into single ended mode (including forward and flyback converter) and double ended mode (push-pull, half bridge and full bridge converter); the converting technique comprises hard-switched converters and soft-switched converters, and the controlling techniques comprise PFM (Pulse Frequency Modulation) mode control, PWM (Pulse Width Modulation), current mode control, voltage mode control and so on.

Regardless what methods or mode are used, a switching power circuit generally comprises a converter circuit having one or more field effect transistor, a transformer or an inductance, and at least one rectifying filter output circuit, wherein the quantity of the field effect transistor is subject to the choice of power converter mode, commonly, single ended converter comprises a field effect transistor, the double ended converter comprises a plurality of field effect transistors. In case of the soft switch is applied, at least one more supplemental field effect transistor is necessary. The inductance here is being used for the simple non-isolated DC/DC converter, while the choice of the chosen converter will simultaneously determine whether the inductance, single-ended or double-ended mode, hard switching or soft switching, to be applied in practice.

Further, the switching power circuit comprises a feedback circuit having a sample circuit, an error amplifier, and occasionally a feedback isolating circuit, wherein the sample circuit is adapted for sampling the current and voltage signal from the output circuit, and sending the sampled current and voltage signal to the error amplifier to obtain a comparative value, afterwards, the error amplifier will output an error signal.

Additionally, the switching power circuit comprises a control circuit including an adjustable pulse circuit and a drive circuit, wherein the adjustable pulse circuit having PFM (pulse frequency modulation) mode, PWM mode and so on. According to the error signal, the adjustable pulse circuit is capable generating a basic pulse, for double-ended mode, there is a scaling-down complementary double pulse circuit, for soft switching multi-pulse circuit, there is a multi pulse circuit. Commonly, basic pulse, double pulse and multi-pulse are supposed to be directed into the driven circuit. It is noted that a bigger error signal will result to a larger duty cycle ratio, as well as a higher peak value of the field effect transistor current and a saturation susceptible transformer.

Finally, the switching power circuit also comprises an supplemental circuit which is selected from a group consisting of initiating circuit, protective circuit, voltage reference circuit, EMC circuit, and alternate rectifying filter circuit, wherein the protective circuit could be further classified into the lower voltage protective circuit, high voltage protective circuit and upper limit current protective circuit. Whenever the switch power supply is initiated or overloaded, the transformer and induction is susceptible to be saturated, and field effect transistor is apt to be loaded with over current. So within the art, the power switching IC employs the upper limit protective circuit for protection, that is to say, when the current reach the upper limit, the field effect transistor will be automatically shut off. Therefore, it is required that the control circuit to be promptly responsible and the field effect transistor be equipped with instantaneously shutting-off function. Otherwise, there exist some sort of hidden risks for the field effect transistor and transformer. For the initiating circuit, there are resistance initiating circuit and switch-off constant current source initiating circuit available within the art.

SUMMARY OF THE PRESENT INVENTION

A primary object of the present invention is to provide a method for preventing current overloading and saturation of a switch power supply.

The present invention further provides a method for preventing current overloading and saturation of a switch power supply, comprising the following steps:

1) checking whether a primary current of a transformer (or a current of an induction), or a current of field effect transistor being excess an upper limit current;

2) generating an adjusting signal so as to directly or indirectly adjusting an error signal if the upper limit current is excess the upper limit, so that during subsequent pulse adjustable periods, a duty cycle is reduced, the primary current (or the induction current) or field effect transistor peak current value are reduced, wherein the error signal is outputting signal from an error amplifier or is inputting signal from a pulse adjustable circuit, the error adjustable signal is a direct error adjustable signal, the indirect adjusting signal is an inputting signal from the error amplifier or an outputting signal from a sample adjustable circuit to adjust the error signal;

In the step 2), if an over-limit current was detected, the error signal would be adjusted, and the adjusting capacity is a fixed value.

The step 2) further comprises a step for continuously adjusting the error signal during the subsequent pulse adjustable periods if an over-limit current is detected, wherein the adjusting capacity is an gradually decreased value, from a maximum value to 0; It is noted that during the subsequent adjustable periods, in case of the upper limit current is excess again, the adjusting procedure will be restarted gradually decreasing from the maximum value to 0.

The present invention further provides an overloading and saturation preventative switch power supply according to the above mentioned procedure, comprising:

a converter circuit comprising one or more field effect transistor, a transformer (or an induction), at least a path of rectifying filter outputting circuit, and sometimes a soft switch circuit;

a feedback circuit comprising a sample circuit, an error amplifier, and sometimes a feedback isolation circuit;

a control circuit comprising a pulse adjustable circuit and a driven circuit, where the pulse adjustable circuit is selected from a group consisting of PFM mode, PWM mode and so on; and a supplemental circuit;

wherein a protective circuit of the supplemental circuit comprises a serial of transformer primary (or inductance) or field effect transistor current sample circuit, a serial of transformer primary (or inductance) or field effect transistor upper limit current detecting circuit, and a regulating circuit adapted for directly and indirectly regulating the error signal according the outputted signal from said detecting circuit, wherein the regulating circuit is a D flip-flop being downward edge triggered and high electrical level preset. The clock signal of the D flip-flop is the pulse signal of the pulse adjustable circuit of the control circuit. The data terminal of the D flip-flop will be feed into with a low electrical level. And the preset input terminal of the D flip-flop will be feed into the outputted signal from the detecting circuit. If the D flip-flop is under a high electrical level, the open circuit will output an error regulating signal. Therefore, whenever an over limit current is detected, the regulating circuit will automatically regulate the error signal. It is noted that the regulating volume is a fixed value.

According to the present invention, the converter circuit of the switch power supply is single ended converter circuit, and the field effect transistor is transistor, the driven circuit comprise at least two path of output signal, one path is coupled with the base of the transistor, and the other path is coupled with the emitter of the transistor. The base of the transistor is electrically connected with a high voltage power source via a highly resistible resistance. Associated with related circuits, the highly resistible resistance and transistor of the converter could be applied as a portion of the power on initiating circuit, so as to improve the withstanding of the transistor.

The switch power supply of the present invention utilizes a single switch power supply IC which at least integrates a portion of control circuit and protective circuit.

Accordingly, the switch power supply of the present invention is adapted to prevent current overloading and saturation so as to ensure a higher quality and performance, and at the same time, to reduce the overall costs.

These and other objectives, features, and advantages of the present invention will become apparent from the following detailed description, the accompanying drawings, and the appended claims.

DETAILED DESCRIPTION OF THE PREFERRED EMBODIMENT

Figure 1:
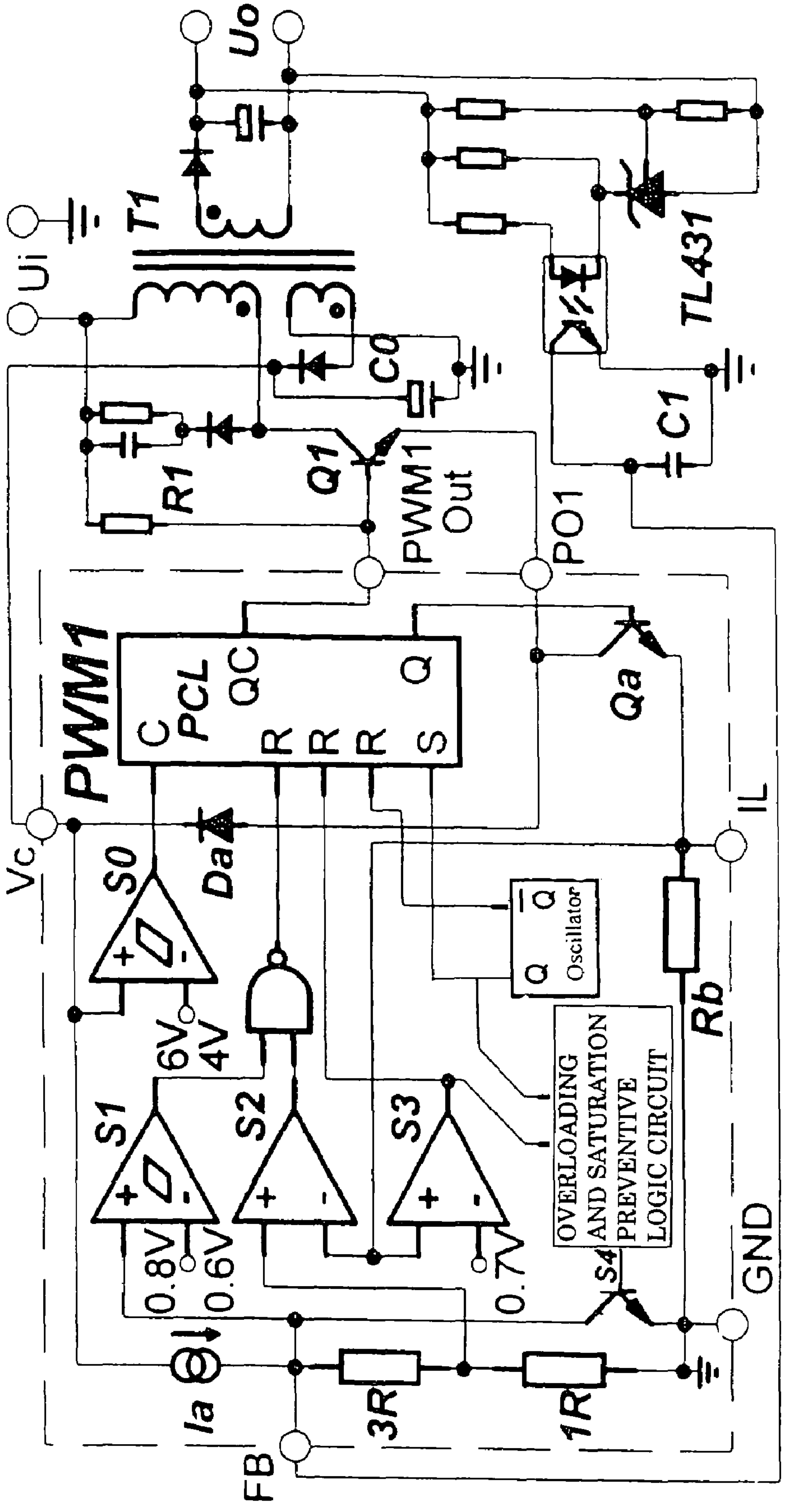
FIG. 1 is a schematic diagram of an undefined PWM switch power supply having an initiating circuit to prevent overload and saturation.
Figure 2:
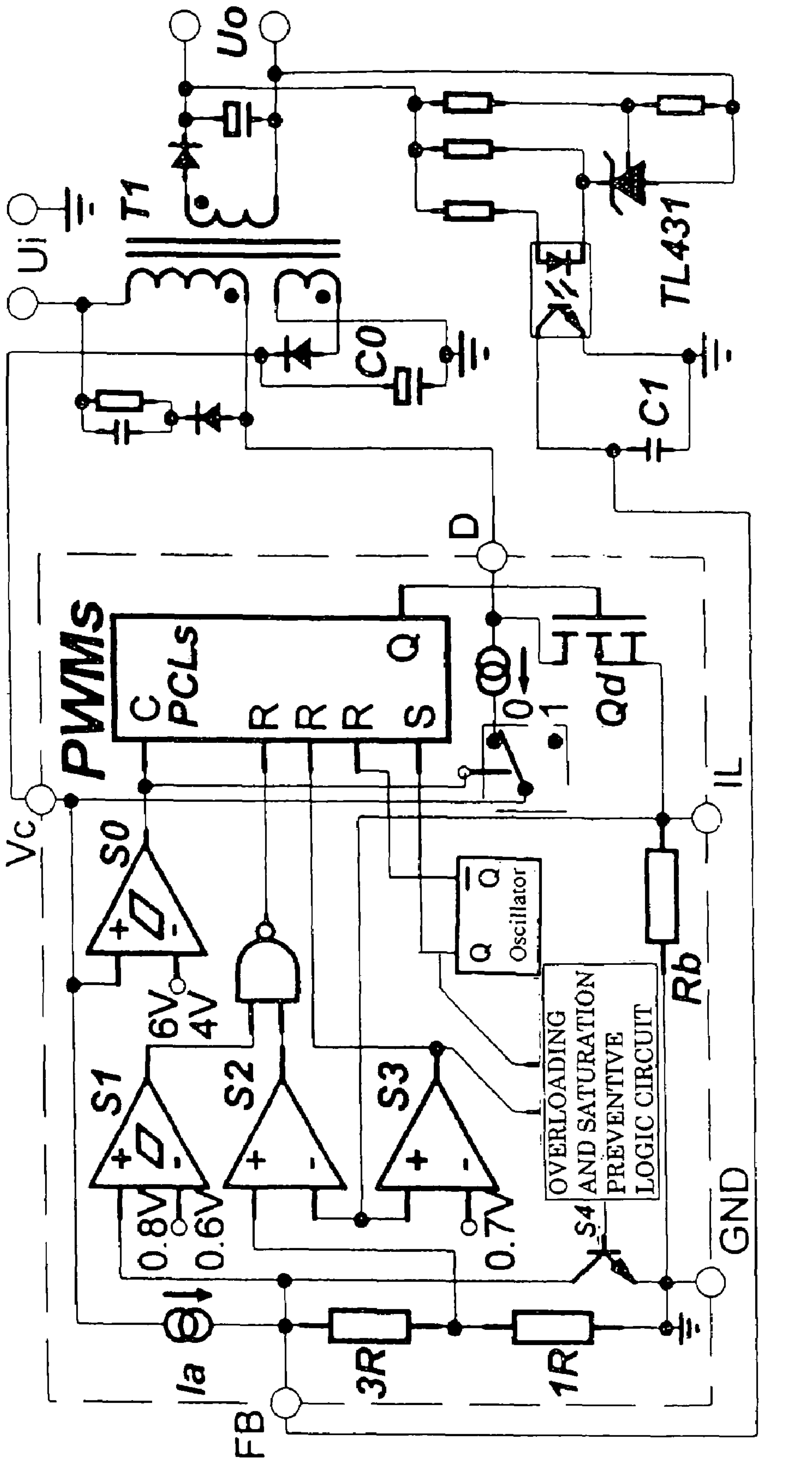
FIG. 2 is a schematic diagram showing an alternative mode of an unqualified PWM switch power supply having an initiating circuit to prevent overload and saturation.

Referring to FIG. 1 and FIG. 2, the independently used switch power supply, for example a charger, a green switch power supply IC standby power supply unit, or a universal switch power supply is illustrated. Q1 is an economical power transistor; Qd is a field effect transistor; the region circumscribed within the dash line is IC portion. It is noted that Rb and Qa could integrated in the IC portion or apart with the IC portion according to the semiconductor manufacturing process. Furthermore, Rb could be integrated within the IC portion according to the optimizing request of a lower power output. In case of a higher output power is needed, the Rb could be coupled with an external resistor in a parallel manner for outputting a bigger power.

Figure 3:
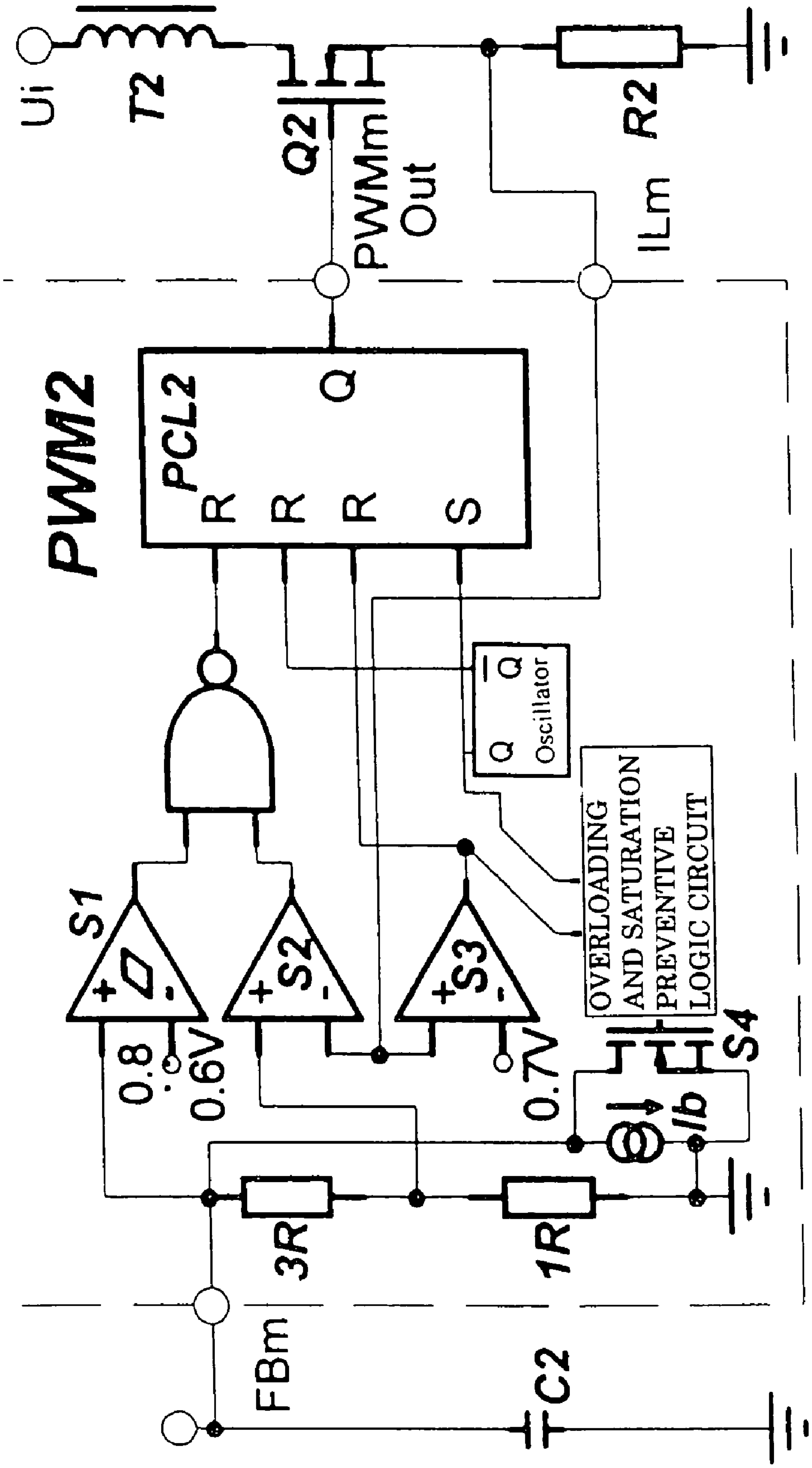
FIG. 3 is a schematic diagram of an overload and saturation preventative undefined PWM switch power supply according to the preferred embodiment of the present invention.

As shown in FIG. 3, a main power supply adapted for being used as a green switch power supply is illustrated. The region circumscribed by the dash line is IC portion, the field effect transistor Q2 could be either integrated in the IC portion or disposed outside the IC portion. Ia, Ib are current source.

S0 is a Schmidt comparator. The working condition of the IC power supply voltage monitoring circuit is subject to the condition of the S0. That is to say, if the S0 is in a lower level, the IC power supply voltage monitoring circuit is set in an initiating state, instead, if the S0 is in a high level, the IC power supply voltage monitoring circuit is set in a normal state.

As shown in FIG. 1, the IC power supply voltage monitoring circuit is set in an initiating state, PCL.QC is high resistance (or output is controllable), the high-voltage high-resistance value R1 provides a base micro-current enabling the power transistor Q1 to be conductible under a lower current of the collector, and to be charging the IC power supply capacitor C0 through diode Da to form an initiating circuit. To ensure that Q1 could be safely initiated, the following procedures could be followed, such as checking the charging current, controlling the PCL.QC outputting, altering Q1 base current, and enabling the Q1 current to be safe value. While the IC power supply voltage monitoring circuit is set in a normal state, PCL.QC and Qa is outputting normally, R1 is disabled. Therefore, if the Q1's amplifying function is considered and compared with the resistance limited current initiating circuit, the initiating circuit under a normal state will be reduced to a less extent.

As shown in FIG. 2, under an initiating state, capacitor C0 is charged by high voltage high current power supply to form PWMs initiating circuit; under a normal state, PWMs is resumed to be a normal state, and the high voltage current power supply is cut off. As shown in FIG. 3, since the main power supply and the standby power supply share IC power supply voltage monitoring circuit, so that S0 is effective towards PWM2, under the initiating state, PWM2 is cut off.

As shown in FIG. 1, under a normal state, the output from PCL.QC and PCL.Q is the same. For example, if the output is high electrical level, Q1 and Qa is conductible, Rb is adapted to check the instantaneous current of Q1; if the high level output converts to a lower level, Qa will be cut off, due to the fact of memory effect, Q1 will not cut off immediately, and diode Da will be fly-wheel, or a time delay circuit is designed to delay Qa' off until Q1 is cut off, or Qa force emission terminal of Q1 clamping to be a value 1.5V, as a result, the base voltage of Q1 0V will be reverse bias so as to increase the withstand voltage of the collector of Q1.

As shown in FIG. 2, under a normal state, if PCLs.Q outputs a high electrical level, Qd will be conductible, Rb is adapted for checking the instantaneous current of Qd; if the output is a lower electrical level, Qd will be cut off. As shown in FIG. 3, under a normal state, if PCL2.Q outputs a high electrical level, Q2 is conductible, R2 is adapted for checking the instantaneous current of Q2; if the output is low level, Q2 is cut off.

S2 and PWM comparator shares a same mechanism, that is, as long as the oscillator Q arisen, the field effect transistor is conductible, the primary current of the transformer will be increased as well as the voltage drop. When the voltage drop equal to or bigger than the error signal which are represented as voltage UC1 or UC2, S2 will output a lower electrical level and the field effect transistor will be cut off; However, the maximum cycle ration is determined by the oscillator, that is to say, if the output from the S2 is high level, oscillator Q will convert to a lower level and the field effect transistor will be cut off; here, the schmiter comparator S1 could be embodied as a main power supply prohibitive circuit. if the error signal has a value less than the threshold value, then the field effect transistor cycle will be forcedly cut off, instead, if the error signal value higher than the threshold value, the field effect transistor cycle will be turned on, so as to increase the conversion efficiency while the switch power supply is light loaded.

The upper limit current comparator S3 could be embodied as an upper limit current checking circuit. In case of the primary transformer or field effect transistor reach the upper limit current, S3 is capable of enabling the overloading and saturation preventative logic S5 and simultaneously turn off the field effect transistor. There are several methods available, according to the present invention, S5 is enabled only once, and S4 is adapted for conducting an oscillator cycle if the following circumstance is satisfied. The current of S4, namely I4, should be bigger current than the current source Ia or the main voltage feedback current minus current source Ib. (as shown in FIG. 3, the difference value is Ic). It is noted that I4, Ia and Ic have attributed to the UC1 and UC2 within a single PWM cycle are ranged within 2.8V*(−10%), while the maximum current output should be above 95%. In case of the assignment from Ia towards UC1 is 2.8V*3.3%, I4 could be selected three or four times bigger than Ia. As a result, the error signal will be weakened, so in the next PWM cycle or the following PWM cycle, the duty cycle will be decreased and the primary current of the transformer and the peak current of field effect transistor will be decreased as well.

For those quick power tubes, transformers having bigger capacities, and quick responding control circuit, the error signal will be located close to the maximum value if overloading. For those slow field effect transistors, transformers having limited capacities (once the transformer is saturated, the primary current will increase to excess the upper limit), or retarded response control circuit, the error signal will be less than the theoretical maximum value, so the control circuit will turn off the field effect transistor in advance. Even though there are still existed some chances that power tube having upper limited current or transformer saturation, however, the time is limited and the safety of the field effect transistor and transformer could be guaranteed.

Another method is to enable S5 once, I4=Ia(Ic)*1.2; In the succeeding PWM cycle, if the S5 is not enabled, I4=Ia(Ic)*0.8, afterwards, the S5 is disabled. It is noted that above multiple constant 1.2 and 0.8 could be bigger than 1 or less than 1, the exact value should be referenced by the instantaneous response of the switch power supply. This method could further improve the protection for the field effect transistor and transformer so as to increase the maximum current output. What is more, S5 could be embodied as a digital processing logic to deal with the overloaded I4. To achieve a better monitoring effect, S5 is optimized to output an overloading monitoring signal.

As shown in FIG. 1, FIG. 2 and FIG. 3, the single ended continuous current mode is embodied, as a result, PCL, PCLs, PCL2 and S5 are implemented with time delay circuit for preventing a pinnacle from being started which could accidentally turn off or enable S5.

It is worth to mention that above overloading and saturation preventative switch power supply PWM control techniques are also applied in push-pull, half-bridge, and full-bridge structure. If primary current of transformer or a current of field effect transistor is checked over upper limit by the overloading and saturation preventative circuit, then the error signal will be forcedly adjusted (for example,TL494 adding force adjusting pin3 and pin4 level to S3, S5), so that in the next or subsequent PWM cycle, the duty cycle ration will be fall down, and the peak current of the field effect transistor and transform-primary will be reduced as well, as a result, the field effect transistor and the transformer are well protected thus significantly improving the security and reliability of the switch power supply.

In other words, a single ended PWM control circuit which adopted an economical switch power transistor, comprises an input and output respectively coupled with the base and emitter of the transistor, wherein the base of the transistor includes a high voltage, highly resistant resistance connected with the high voltage source or collector of the transistor (via the transformer-primary to coupled with high voltage source). Under the enabling state, the high voltage, highly resistant resistance (output being controllable), which is coupled with the base, is adapted for providing the transistor a base micro-current, and the current of the emitter of the transistor will charge the IC power supply filter capacitor through the diode so as to accomplish the starting up process. Under the normal state, PWM is in positive period, one path enables the transistor to be positive biased, while another path drops down the emitter of the transistor, then the transistor is conductible; if the PWM is in negative period, one path drops down the base of the transistor. Due to the fact of the memory effect, the transistor will not be cut off immediately, the emitter of the transistor could be fly wheeled by the diode, or the emitter of the transistor could be dropped down to delay the time until the transistor is cut off, or until the emitter of the transistor being clamped. It is noted that after the transistor is cut off, the base of the transistor is negative biased so that the voltage withstanding of the collector of the transistor have been significantly improved.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A method for preventing current overloading and saturation of a switch power supply, comprising:

(a) checking whether a feedback current of a converter circuit exceeds an error signal of an cycle;

(b) cutting off a field effect transistor if said feedback current of said converter circuit exceeds said error signal of said cycle;

(c) generating an adjusting signal for adjusting said error signal of a subsequent cycle if said feedback current of said converter circuit exceeds said error signal of said cycle; and (d) reducing said error signal of said subsequent cycle according to said adjusting signal, so that during said subsequent cycle said feedback current of said converter circuit is for preventing current overloading and saturation of said switch power supply.

2. The method, as recited in claim 1, wherein said step (d) of reducing said error signal further comprises:

(d.1) turning on a transistor during said subsequent cycle according to said adjusting signal; and (d.2) reducing said error signal by passing a portion of current attributed to said error signal.

3. The method, as recited in claim 2, wherein said converter circuit comprises a transformer.

4. The method, as recited in claim 2, wherein said converter circuit comprises an inductance.

5. The method, as recited in claim 2, wherein said converter circuit comprises a transistor.

6. The method, as recited in claim 2, wherein said switch power supply uses PWM, wherein said cycle is PWM cycle.

* * * * *